United States Patent
Hess

(10) Patent No.: US 7,461,043 B2
(45) Date of Patent: Dec. 2, 2008

(54) METHODS AND APPARATUS TO ABSTRACT EVENTS IN SOFTWARE APPLICATIONS OR SERVICES

(75) Inventor: Christopher K. Hess, San Francisco, CA (US)

(73) Assignee: Siemens Aktiengesellschaft, Munich (DE)

( * ) Notice: Subject to any disclaimer, the term of this patent is extended or adjusted under 35 U.S.C. 154(b) by 223 days.

(21) Appl. No.: 11/304,415

(22) Filed: Dec. 14, 2005

(65) Prior Publication Data

US 2007/0150783 A1    Jun. 28, 2007

(51) Int. Cl.
*G06N 5/02* (2006.01)
(52) U.S. Cl. .......................... 706/46; 706/45; 715/739; 715/866; 715/764
(58) Field of Classification Search ................ 706/8, 706/16, 17, 11, 45–46, 61; 715/505–508, 715/513, 516, 530, 704, 700, 701, 724, 738, 715/739, 744–747, 762–772, 780–866; 714/1–5, 714/47, 799
See application file for complete search history.

(56) References Cited

U.S. PATENT DOCUMENTS

| | | | | |
|---|---|---|---|---|
| 5,388,189 | A * | 2/1995 | Kung | 706/45 |
| 5,701,400 | A * | 12/1997 | Amado | 706/45 |
| 6,421,655 | B1 * | 7/2002 | Horvitz et al. | 706/61 |
| 6,438,579 | B1 * | 8/2002 | Hosken | 709/203 |
| 6,901,398 | B1 | 5/2005 | Horvitz et al. | |
| 6,925,433 | B2 | 8/2005 | Stensmo | |
| 6,925,650 | B1 | 8/2005 | Arsenault et al. | |
| 2004/0215657 | A1 * | 10/2004 | Drucker et al. | 707/104.1 |
| 2005/0154723 | A1 | 7/2005 | Liang | |
| 2006/0015818 | A1 * | 1/2006 | Chaudhri et al. | 715/779 |
| 2006/0101351 | A1 * | 5/2006 | Cowham | 715/783 |
| 2006/0107219 | A1 * | 5/2006 | Ahya et al. | 715/745 |

OTHER PUBLICATIONS

Nat Friedman, "Dashboard", XIMIAN, Jul. 25, 2003. 23pgs.
Daniel Billsus et al., "Improving Proactive Information Systems", IUI '05, Jan. 9-12, 2005, San Diego, California, USA. Copyright 2005 ACM 1-58113-894-6/05/0001. 8pgs.
Jay Budzik et al., "Watson: An Infrastructure for Providing Task-Relevant, Just-In-Time Information". 6pgs.
Mary Czerwinski et al., "Visualizing Implicit Queries For Information Management and Retrieval", Papers, CHI 99 May 15-20, 1999, pp. 560-567.
Michael Beigl, "MemoClip: A Location based Remembrance Appliance", 5pgs.
Samuel Kaski et al., "User models from implicit feedback for proactive information retrieval", 2pgs.
Susan Dumais et al., "Stuff I've Seen: A System for Personal Information Retrieval and Re-Use", *SIGIR '03*, Jul. 28-Aug. 1, 2003, Toronto, Canada. Copyright 2003 ACM 1-58113-646-3/03/0007. 8pgs.
Meredith Ringel et al., "Milestones in Time: The Value of Landmarks in Retrieving Information from Personal Stores", 8pgs.

(Continued)

*Primary Examiner*—David R Vincent
*Assistant Examiner*—Omar F Fernandez Rivas

(57) ABSTRACT

According to some embodiments, a system may be monitored to detect change events. A sequence associated with the detected change events may then be stored. The sequence may then be modified by deleting information associated with a detected change event. The sequence might also (or instead) be modified by adding information associated with a non-detected change event. Information associated with the normalized sequence may then be provided.

15 Claims, 15 Drawing Sheets

OTHER PUBLICATIONS

Travis Bauer et al., WordSieve: A Method for Real-Time Context Extraction, 14pgs.

B. J. Rhodes and P. Maes, "Just-in-time information retrieval agents", IBM Systems Journal, vol. 39, Nos. 3&4, 2000, 0018-8670/00, © 2000 IBM, Rhodes and Maes. pp. 685-704.

Jim Youll et al., "Impulse: Location-based Agent Assistance", MIT Media Lab, 2pgs.

Mik Lamming and Mike Flynn, "Forget-me-not" Intimate Computing in Support of Human Memory, Rank Xerox Research Center, Cambridge, England, 9pgs.

Paul De Bra et al., "Task-Based Information Filtering: Providing Information that is Right for the Job". [Retrieved Dec. 12, 2005]. Retrieved from Internet, 5pgs.

Bradley J. Rhodes, "Margin Notes Building a Contextually Aware Associative Memory", Jan. 9-12, 2000. [Retrieved Dec. 12, 2005]. Retrieved from Internet, 9pgs.

"Click popularity—A Promotion Guide". [Retrieved Dec. 12, 2005]. Retrieved from Internet, 3pgs.

"Activity Monitor—Employee Monitoring Software", Network PC Monitoring Software, SoftActivity. [Retrieved Dec. 12, 2005]. Retrieved from Internet:, 5pgs.

"Active Windows Extensions (AWE)". [Retrieved Dec. 12, 2005]. Retrieved from Internet:, 4pgs.

"All Your Information Is Within Reach", Nov. 1, 2005, EasyReach™. [Retrieved Dec. 12, 2005]. Retrieved from Internet:, 2pgs.

"XI® Desktop Search—Find, view, and act on email and files throughout your enterprise". [Retrieved Dec. 12, 2005]. Retrieved from Internet:, 2pgs.

"Viapoint Corporation—Creator of the Smart Organizer for communications professionals", Nov. 15, 2005. [Retrieved Dec. 12, 2005]. Retrieved from Internet:, 1pg.

"Blinkx 3.5" [Retrieved Dec. 12, 2005]. Retrieved from Internet:, 4pgs.

Entopia Technology, "True Relevancy" [Retrieved Dec. 13, 2005]. Retrieved from Internet: URL: http://222.entopia.com/technology/relevancy/index.html, 2pgs.

Neil J. Rubenking, "Creo Six Degrees 2.0", Jun. 2, 2004. [Retrieved Dec. 13, 2005]. Retrieved from Internet:, 5pgs.

Henry Lieberman, "Letizia: An Agent That Assists Web Browsing". [Retrieved Dec. 13, 2005]. Retrieved from Internet:, 9pgs.

Bradley J. Rhodes and Thad Starner, "Remembrance Agent: A continuously running automated information retrieval system". [Retrieved Dec. 13, 2005]. Retrieved from Internet:, 6pgs.

C. Hess, M. Wynblatt, and M. Sher, U.S. Appl. No. 11/304,432, filed Dec. 14, 2005, , entitled "Methods and Apparatus to Recall Context Relevant Information".

C. Hess, and M. Wynblatt, U.S. Appl. No. 11/304,917, filed Dec. 14, 2005, entitled "Methods and Apparatus to Determine Context Relevant Information".

C. Hess, U.S. Appl. No. 11/304,527, filed Dec. 14, 2005, entitled "Methods and Apparatus to Determine a Software Application Data File and Usage".

* cited by examiner

600

| FIRST DATA OBJECT ID 602 | SECOND DATA OBJECT ID 604 | TYPE 606 | WEIGHT 608 | CONF. 610 | COUNT 612 |
|---|---|---|---|---|---|
| DO101 | DO643 | TOGGLE | 2 | 2 | 1 |
| DO101 | DO530 | OPEN AT SAME TIME | 4 | 1 | 1 |
| DO102 | DO331 | TOGGLE | 5 | 4 | 59 |

| SEQUENCE POSITION 1502 | DATA OBJECT ID 1504 | TIME STAMP 1506 | ACTION TYPE 1508 |
|---|---|---|---|
| S0001 | DO1001 | 1/1/2005 13:43.2573 | OPEN |
| S0002 | DO1001 | 1/1/2005 13:43.2588 | ACTIVATE |
| S0003 | DO1001 | 1/1/2005 13:46.8204 | COPY CONTENT TO DO5331 |

FIG. 15

METHODS AND APPARATUS TO ABSTRACT EVENTS IN SOFTWARE APPLICATIONS OR SERVICES

TECHNICAL FIELD

The present disclosure relates generally to software applications or services and, more particularly, to methods and apparatus that monitor usage of software applications or services.

BACKGROUND

As a person uses a computer system, a sequence of interactions occurs between the person and the software applications being used. These interactions (e.g., activating a document, scrolling in the document, or copying information from a document) constitute a sequence of actions as the user manipulates the applications. This sequence of actions can be used, for example, to perform analysis in order to infer user behavior and how the information that the user is accessing may be related to one another. For example, if an image is copied from one document to another document, the sequence of actions may include 1) activating an application document, 2) copying an image, 3) activating a different application document, and 4) pasting the image. If these actions were stored, the usage of applications and/or services could be monitored and/or analyzed.

SUMMARY

Methods, systems, and computer program code are therefore presented to monitor usage of software applications or services.

According to some embodiments, systems, methods, and computer code are operable to monitor a system and detect change events. A sequence associated with the detected change events may then be stored. The sequence may then be modified by deleting information associated with a detected change event. The sequence might also be modified by adding information associated with a non-detected change event. Information associated with the normalized sequence may then be provided.

Other embodiments may provide: means for monitoring a system to detect change events; means for storing a sequence associated with the detected change events; means for normalizing the sequence by at least one of deleting information associated with a detected change event or adding information associated with a non-detected change event; and means for providing information associated with the normalized sequence.

With these and other advantages and features of embodiments that will become hereinafter apparent, embodiments may be more clearly understood by reference to the following detailed description, the appended claims and the drawings attached herein.

BRIEF DESCRIPTION OF THE DRAWINGS

FIG. 6 illustrates information in an evidence store according to some embodiments;

FIG. 15 illustrates information in a sequence according to some embodiments.

DETAILED DESCRIPTION

Figure 1:
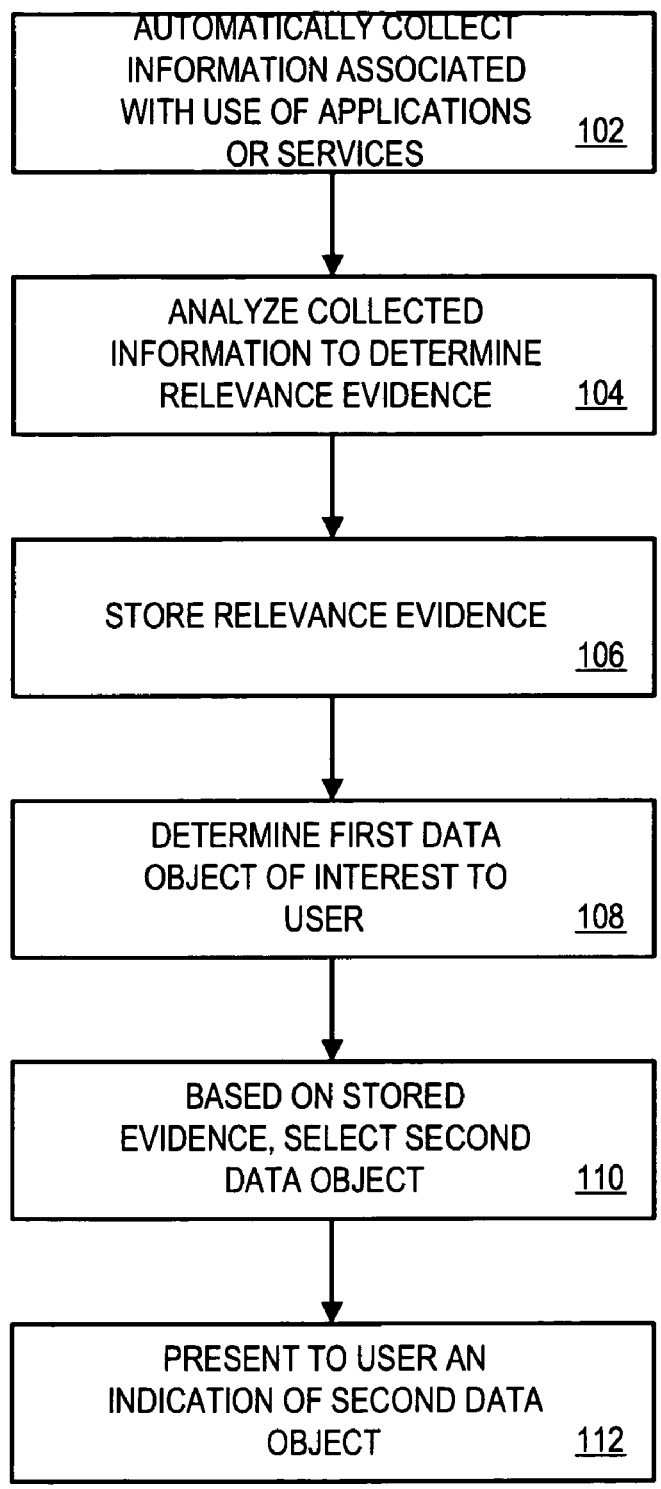
FIG. 1 is a flowchart of a method according to some embodiments.

As a person uses a computer system, a sequence of interactions occurs between the person and the software applications he or she is using. These interactions (e.g., activating or closing a document) may represented by a sequence of actions which in turn may be used, for example, to perform analysis in order to infer user behavior and how the information that the user is accessing may be related to one another.

For example, if an image is copied from one document to another document, the sequence of actions may be detected and some determination can be made to the degree of relatedness of the two documents. That is, since a person took some information from one document and added it to a different document, the two data sources may have some relevance to a task, concept, or each other.

According to some embodiments, it may be determined which data objects are most relevant for a user's current activity or task (context) by accumulating "evidence" of the relatedness of other data objects and using that evidence to determine what information may be important during a given activity. Evidence may be generated, for example, by continually monitoring information usage, location, and content to determine how pieces of information are connected together. Whenever evidence of a connection is determined, it may be stored into an evidence database. "Usage" evidence might be generated, for example, by looking at how users interact with data objects through applications to infer how the objects might be related. As another example, "location" evidence might be generated by determining the proximity of data objects. As still another example, "content" evidence might be generated by analyzing the terms contained within data objects to determine how closely that data object matches to other data objects.

This accumulated evidence might then be used to determine which data objects are connected to one another and how strongly the connections are. Evidence may be used to find which data objects are most relevant during an activity and the strength of evidence is used to order the data objects so that more relevant data objects are placed closer to the top of the resulting list. The list of relevant data objects could be, for example, regenerated every time a user gives focus to a different data object.

According to one embodiment of the present invention, the resulting list of relevant data objects is displayed in a Graphical User Interface (GUI) that is visible at a dedicated and/or user-definable area of the computer display (e.g. a column on the left-hand side of the display). Each data object presented in the relevance list could contain, for example, a hyperlink allowing it to be opened with its preferred native application, or alternately, may specify a custom action. Additional hyperlinks might allow other actions to be performed on the data object, such as getting summary information or getting further relevant information. The displayed results could be organized by separating different types of data objects into separate sections of the display.

In addition to the evidence generated results, other relevant information can be displayed based on relevance rules. For example, given an active telephone call, recent email messages from the caller can be displayed based on a rule that first determines the caller from the incoming phone number and then displaying the last few mail messages to/from the person who is identified as the caller.

FIG. 1 is a flow chart of a method of facilitating access to data objects according to some embodiments of the present invention. The flow charts described herein do not imply a fixed order to the steps, and embodiments of the present invention may be practiced in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 102, information associated with use of data objects by a user is automatically collected. For example, a personal computer user might simultaneously open a first document and a second document, and this fact may be automatically collected by a software application executing in the background of the operating system.

At 104, the collected information is analyzed to determine relevance evidence between data objects. For example, it might be determined that the first document is related to both the second document (because they were open at the same time) and an email message (because the user eventually attached the first document to that email message. This evidence is then stored at 106 (e.g., in a database file).

At 108, a first data object of interest to the user is determined. For example, a user might later re-open the first document and begin to edit the document. Based on the stored relevance evidence, a second data object associated with the first data object is selected. For example, the second document and the related email message might be selected. An indication of the second data object is then presented to the user. Note that more than one related data object might be selected and displayed to the user. For example, a list including the second document and the related email message might be displayed in a dedicated area of a GUI.

According to some embodiments, usage, location, and content of data objects may be analyzed to determine relevance evidence between data objects. For example, it might be determined that two documents share a significant number of unusual words. As another example, a first document might refer to a second document. This additional relevance evidence may also be stored, and the selection of the second data object at 110 could further be based on the stored additional relevance evidence. The selected data object might then be presented to a user at 112 (e.g., via his or her display monitor).

Figure 2:
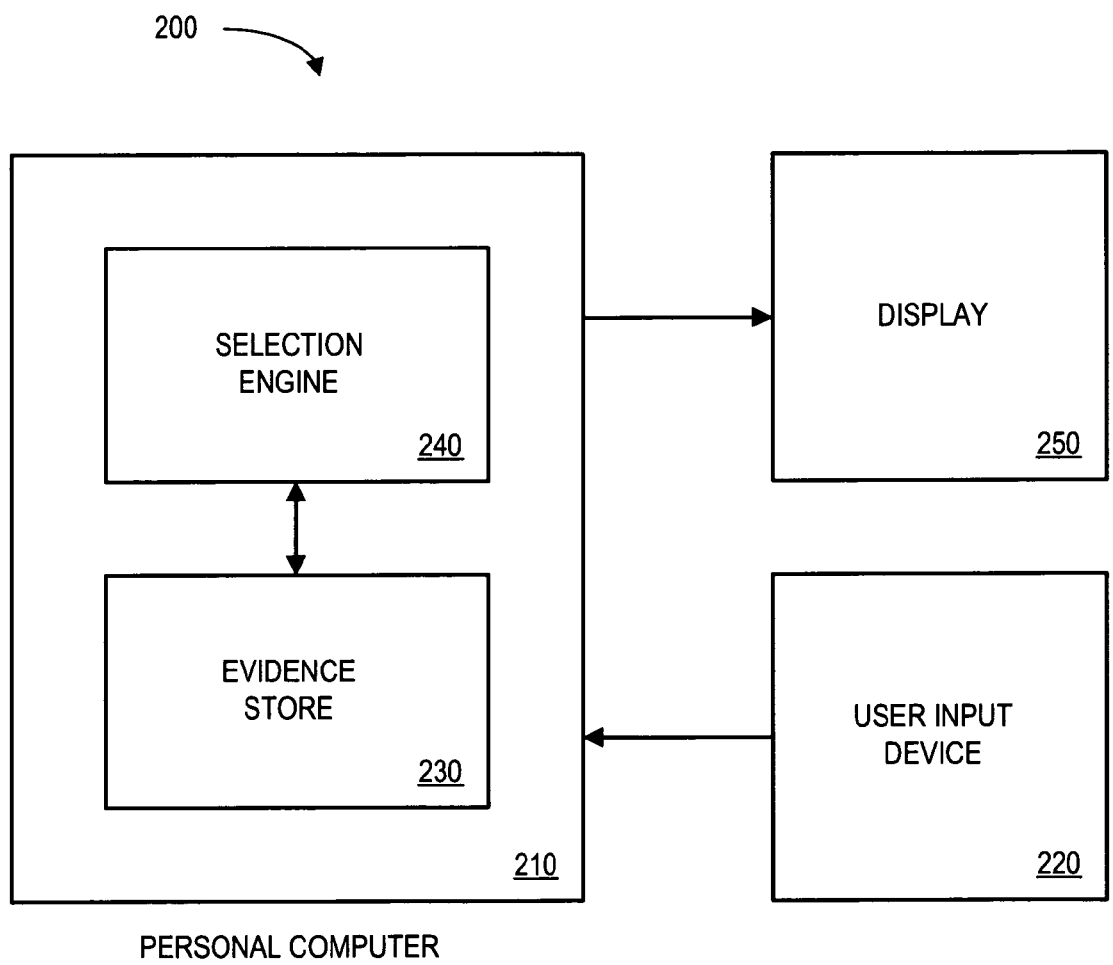
FIG. 2 is a block diagram of a system according to some embodiments.

FIG. 2 is a block diagram overview of a system 200 according to some embodiments of the present invention. The system includes a personal computer 210 (e.g., including one or more INTEL® Pentium® processors) and a user input device 220 (e.g., a computer keyboard or mouse). A user could us the input device 220, for example, to open an email message.

The personal computer 210 includes an evidence store 230 that stores information associated with relatedness between data objects. For example, each entry in the evidence store 230 might indicate that a particular pair of data objects should (or should not) be considered to be related. The evidence store 230 may be associated with any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The personal computer 210 further includes a selection engine 240. When it is determined that a user is interested in a first data object (e.g., he or she opens an email message), the selection engine 240 may access information from the evidence store 230 to select other documents that may be related to the first data object.

Figure 3:
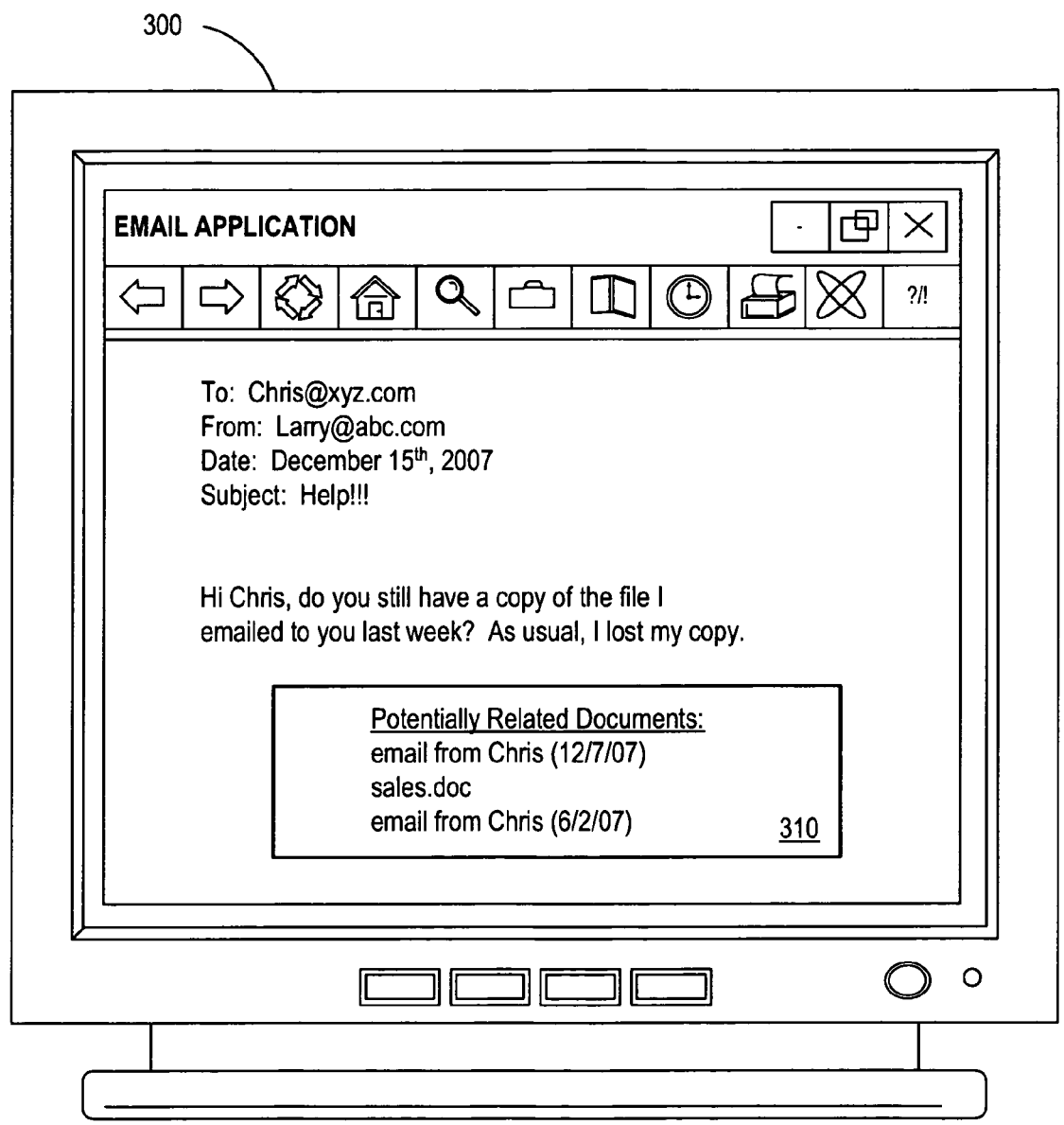
FIG. 3 is a display according to some embodiments.

A display device 250 (e.g., a computer monitor) may then be used to present indications of the related data objects to the user. For example, FIG. 3 is a display 300 according to some embodiments. In this case, the display 300 includes an area 310 in which potentially related documents are listed. In particular, because the user is reading an email message from "Chris@xyz.com," the selection engine 240 has listed three data objects (two email messages and a sales document) that might be related to the particular email message being read by the user.

Note that in some embodiments described herein, computer applications and peripherals are monitored in order to detect when a significant event on a data object has occurred. Each relevant data object is stored in a database that uniquely identifies the entity in the system. Properties of the data object could include the display name, storage location, globally unique identifier, summary information, and/or timestamps. Monitoring of applications and peripherals might be accomplished through software components that are able to interact with the monitored applications to determine when a data object has been operated on. When such an event is detected, the software component might notify the system that an important "action" has taken place on a specific data object.

An "action" may be, for example, a notification message indicating that a data object on the computing system has been manipulated in a significant way. Types of actions might include, for example: opening a data object, closing a data object, activating a data object, deactivating a data object, copying data to/from a data object, creating a data object, deleting a data object, renaming a data object, or making a copy of a data object.

While a user interacts with various applications (and the underlying data objects), the monitoring components might continually detect and send corresponding actions into the system. An action may also result from receiving a signal from an external peripheral or server, such as receiving an incoming phone call or receiving a new message that may be stored on a server.

Figure 4:
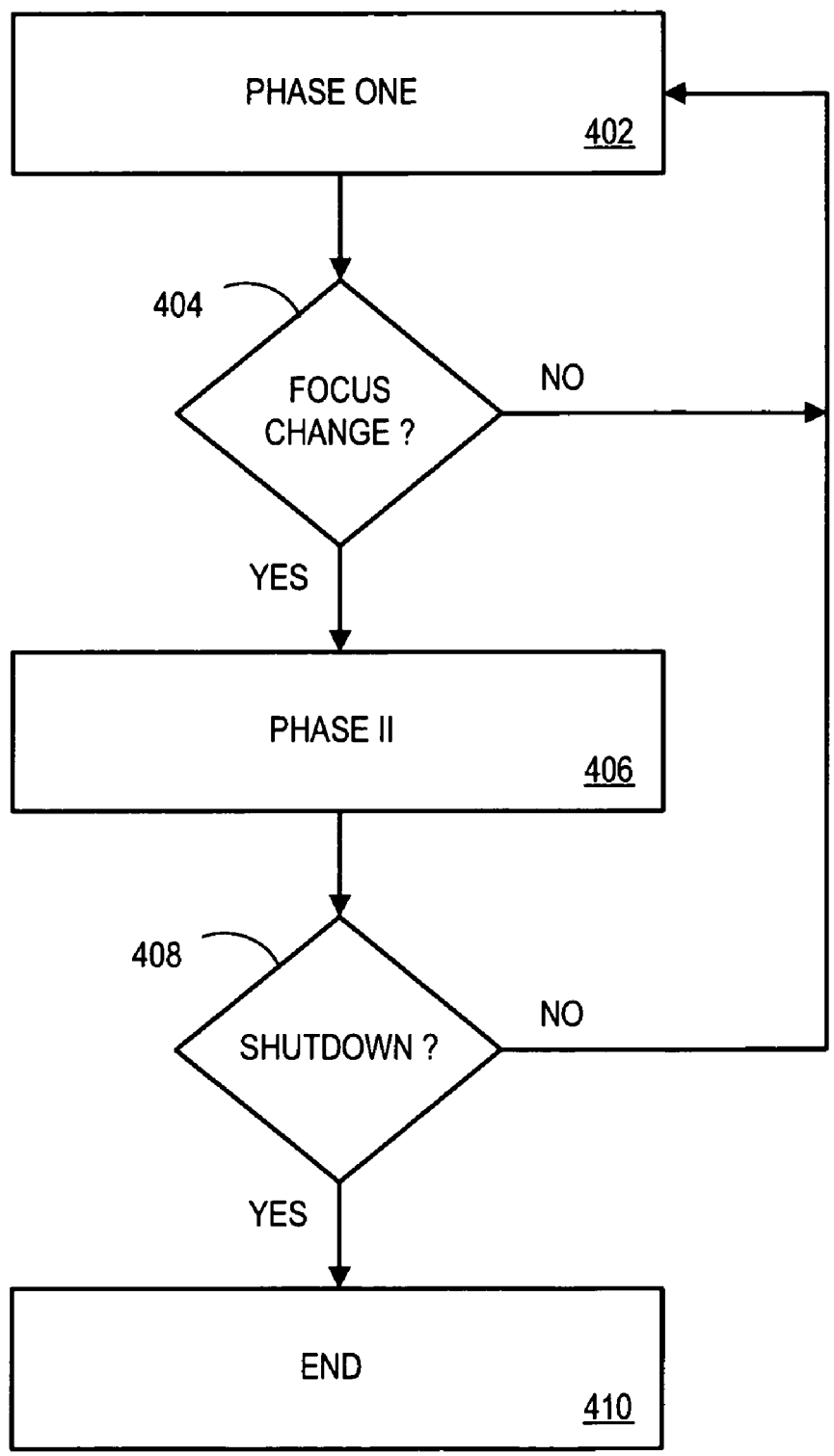
FIG. 4 is a flowchart of an action processing method according to some embodiments.

Actions may be used for two purposes and may be processed in two phases. For example, FIG. 4 is a flowchart of an action processing method according to some embodiments. At 402, "Phase I" processing may be performed. During Phase I, actions may be analyzed to determine if any two data objects are associated in some way and the evidence connecting them is recorded. One embodiment of Phase I processing is provided with respect to FIG. 5.

When no focus change is detected at 404, Phase I processing continues. When a focus change is detected at 404, "Phase II" processing may be performed at 406. During Phase II, an action may act as a signal to initiate a retrieval of relevant information based on accumulated evidence gathered during previous iterations of Phase I. Phase II may be, for example, initiated if an action corresponds to a change of use focus, such as when a new application is activated. One embodiment of Phase II processing is provided with respect to FIG. 7. If Phase II indicates that a shutdown is appropriate at 408, the method ends at 410.

Figure 5:
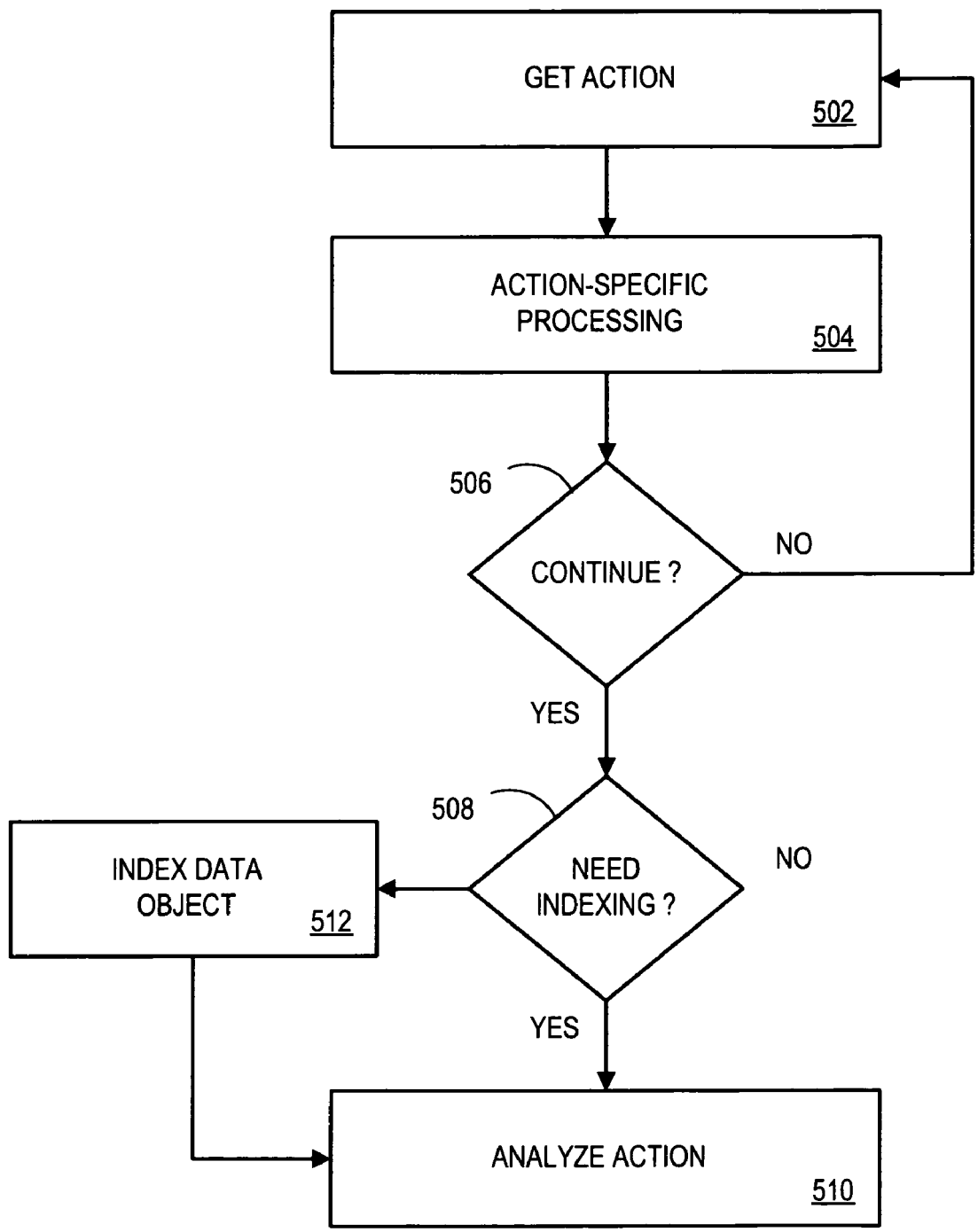
FIG. 5 is a flowchart further illustrating action processing according to some embodiments.

FIG. 5 is a flowchart further illustrating Phase I action processing according to some embodiments. Note that once an action has been generated by a monitoring component, it may be queued up by the system. The system might sequentially retrieve actions from this queue at 502 and processes them in Phase I. The flow chart shown in FIG. 5 describes the steps that are taken, according to one embodiment, to process an action in Phase I.

At 504, action-specific processing may first be applied based on the type of action that was retrieved. For example, an action that specifies that a data object has been deleted from the operating system may remove the data object from any databases. The pre-processor may additionally specify if the action should be processed further. If no further processing is necessary at 506, as might be the case for a deletion action, processing is complete and the system can process the next action at 502.

If further processing is appropriate at 506, the system may decide at 508 if the data object should be indexed. Indexing at 512 might involve, for example, extracting any important terms from the contents of the data object and storing the terms into an index database for the purpose of comparing data objects for term similarity and performing searches to find data objects containing specific terms. A data object might be, for example, indexed if the contents have changed since the last time the system indexed the data object, or if the data object is new and is not yet stored in the index database.

If no indexing was required (or after indexing is performed), the action may be analyzed at 510 to determine if any association between data objects can be inferred based on the action that has occurred. Any inferred relationship may be recorded as "evidence" into a database or "evidence store."

Evidence may be, for example, any information that associates two data objects in some way. FIG. 6 illustrates information in an evidence store 300 according to some embodiments. The illustration and accompanying description of the database presented herein is exemplary, and any number of other database arrangements could be employed besides those suggested by the figure.

Referring to FIG. 6, a table represents the evidence store 600 that may be stored at a personal computer according to an embodiment of the present invention.

Each piece of evidence might consist of two data object identifiers 602, 604 and four properties, which include a type 606, weight 608, confidence 610, and count 612. The "type" property 606 might be a general descriptor of the evidence that identifies how the two data objects are connected. Each type 606 of evidence may have a corresponding "weight" 608 specifying how important different types of evidence are for determining relevance. The "confidence" property 610 might signify how reliable the particular instance of evidence is thought to be. For many types of evidence, a maximum confidence value 610 could be used because the generated evidence can be reliably determined. However, evidence may have a confidence value 610 less than the maximum. For example, in considering associations based on the contents of two documents, the amount of similar words and importance of the words appearing in both documents can affect the degree of similarity, and thus the confidence 610 that the two data objects are related. The count property 612 might specify how many times a type of evidence has been generated between two data objects. The count value 612 might be incremented each time an identical type of evidence is generated between two data objects 602, 604 for which evidence already exists.

Analyzers may be software components that are responsible for discovering a specific type of association between data objects. If such a relationship is found, the analyzer may generate new evidence and record it into the evidence database 600. The system may contain, for example, a core set of analyzers that implement the basic evidence-generation logic. According to some implementations, however, this core set may serve as a foundation for building more complex application-specific analyzers. Some examples of analysis include:

1. Toggle Analysis
  a. Analysis: identifies alternating activation patterns of application windows.
  b. Evidence: associates two data objects where the application windows in which they are hosted have been given focus in sequence.
  c. Rational: toggling back and forth between two applications may signify that the user is referring to multiple data objects during work on a single task.
  d. Category: usage evidence.

2. Simultaneous Use Analysis
  a. Analysis: identifies when two applications are being used at the same time. For example, if a document is opened during a telephone call, it may be related to the person on the call.
  b. Evidence: associates two data objects that are used at the same time.
  c. Rational: using two data objects at the same time may be an indication that the two data objects are being used to complete a single task.
  d. Category: usage evidence.

3. Collocated Files Analysis
  a. Analysis: identifies when data objects are stored in the same location.
  b. Evidence: associates two data objects that are located in the same container (e.g., email messages in a folder).
  c. Rational: users often organize information into hierarchical folder structures, with related items residing in the same folder.
  d. Category: storage evidence.

4. Content Analysis
  a. Analysis: identifies data objects that have many of the same words in common. Several different standard information retrieval techniques might be employed to estimate how similar two entities are in content. Some embodiments may use the Term Frequency Inverse Document Frequency (TFIDF) algorithm with cosine similarity measure.
  b. Evidence: associates two data objects that have some important terms in common.
  c. Rational: data objects with similar content may be related to the same task.
  d. Category: content evidence.

5. File Version Analysis
  a. Analysis: identifies if two data objects are versions of one another. This might be inferred from the naming convention, the similarity of contents, and/or their location.
  b. Evidence: associates two versions of the same data object.

c. Rational: versions often have similar content, reside in the same location, and/or have permuted names.

d. Category: usage evidence.

6. Email Thread Analysis a. Analysis: identifies if an email message is part of a threaded conversation.

b. Evidence: associates two data objects where the data objects are email message that are part of the same thread.

c. Rational: messages within the same thread are often related to the same topic.

d. Category: content evidence.

7. Dwell Time Analysis a. Analysis: determines how long a data object was active while it was opened by the user.

b. Evidence: associates a data object to itself and gives higher importance for longer activation time.

c. Rational: data objects that are active for a longer time may have more importance.

d. Category: usage evidence.

8. Copy Content Analysis a. Analysis: identifies the source and destination of copying content (text, images, tables, cells, etc.) between data objects.

b. Evidence: associates two data objects where content is copied from one data object to another data object.

c. Rational: including content from one document into another may indicate the information sources are related.

d. Category: usage evidence.

9. Copy Data Object Analysis a. Analysis: identifies when a data object is copied to create a new data object instance. For example, documents are often created by using an existing document as a template.

b. Evidence: associates two data objects where one data object is copied to create a new data object.

c. Rational: the original source of a data object may be relevant to the new instance of the object.

d. Category: usage evidence.

10. Email Attachment Analysis a. Analysis: identifies attached documents to an email message.

b. Evidence: associates two data objects where one data object is an email message and the other data object is a document attached to the message.

c. Rational: documents attached to a mail message may be related to the message.

d. Category: storage evidence.

11. Saved Attachment Analysis a. Analysis: identifies when an email attachment is saved to disk or other store.

b. Evidence: associates two data object where one data object is an email message and the other data object is a document attached to the message that is stored on disk or in a store.

c. Rational: the on-disk copy and the mail message to which it was originally attached may be relevant to one another.

d. Category: usage evidence.

12. Attached Document Analysis a. Analysis: identifies when a document is attached to an outgoing email message.

b. Evidence: associates two data objects where one data object is an email message and the other data object is a document that originally resides on disk or in a store and is attached to the message.

c. Rational: same as above.

d. Category: usage evidence.

13. Navigation Analysis a. Analysis: identifies when a user selects a hyperlink in a Web page or rich text document.

b. Evidence: associates two data objects where one data object contains a hyperlink and the other data object is pointed to by the hyperlink.

c. Rational: the original creator of the content explicitly placed a hyperlink to allow the user to navigate to new content because there is some connection between the two data objects.

d. Category: usage evidence.

14. Printing Analysis a. Analysis: identifies when a document is printed.

b. Evidence: associates a printed data object to itself to give it higher importance.

c. Rational: printing a document may indicate importance since the user had taken the effort to create a hard copy of the document.

d. Category: usage evidence.

Note that some evidence may not need to be stored in the form of evidence, but might be calculated or retrieved as needed through other means. For example, collocated file analysis might determine which data objects reside in the same container and generate evidence connecting each data object with every other data object in the same location. This evidenced could be determined by storing a container identifier (e.g., associated with a folder in which the data object resides) with each data object and using that identifier to find all data objects that reside in the same container. With this technique, the system might store less evidence and save space in the evidence database.

Referring again to FIG. 4, if an action signifies a change of user focus at 404 (e.g., when a user activates a window containing a document in a word processor application), Phase II processing may be performed. In general, the system may build a list of relevant and related data objects and notify any components of the updated information. The system may use the collected evidence to build an ordered list of other data objects relevant to the target data object. The task of building this list may determine i) which data objects are relevant and ii) how to order the data objects in the list so that the most relevant objects are closer to the top of the list.

Figure 7:
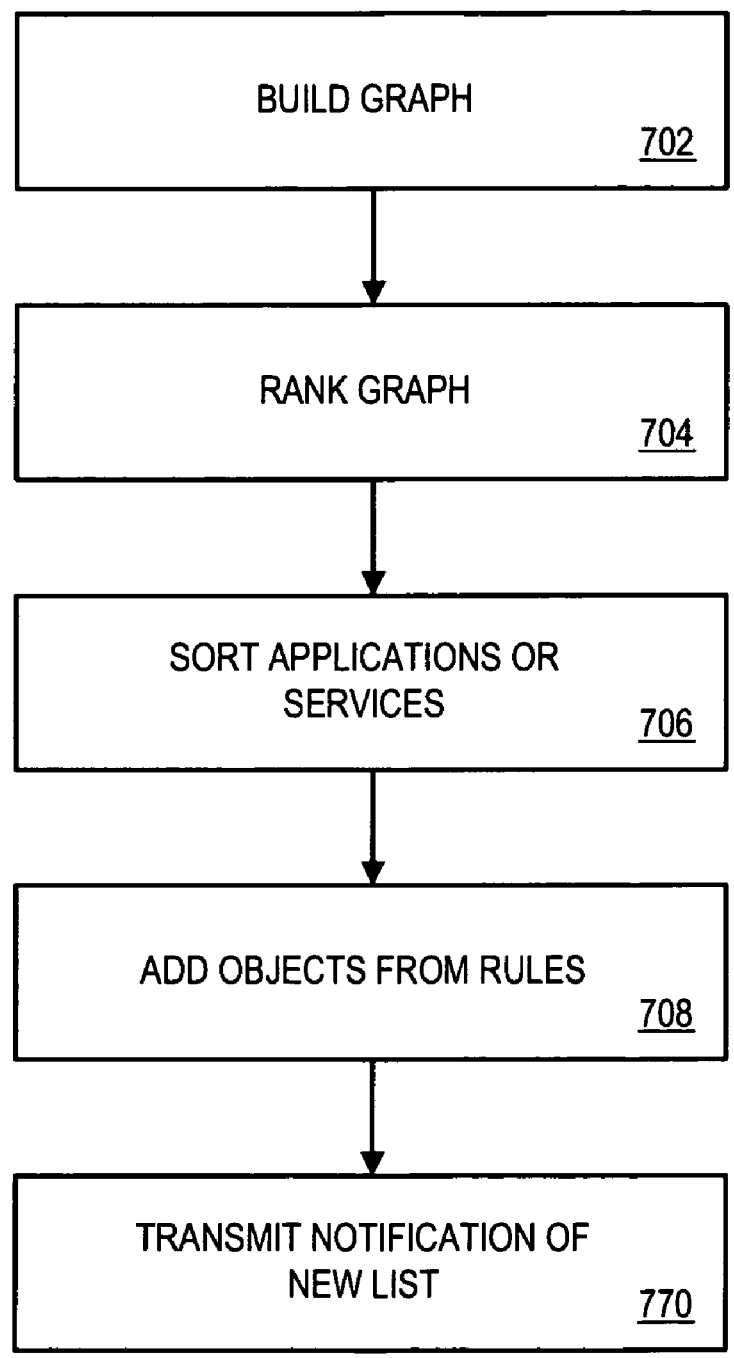
FIG. 7 is a flow chart illustrating action processing according to some embodiments.

For example, FIG. 7 is a flow chart illustrating one embodiment of Phase II action processing. At 702, a "graph" of appropriate data objects may be built. That is, building the list of data objects relevant to the target might involve creating a graph where nodes consist of potentially relevant data objects and edges are the collected evidence that associate data objects.

Figure 8:
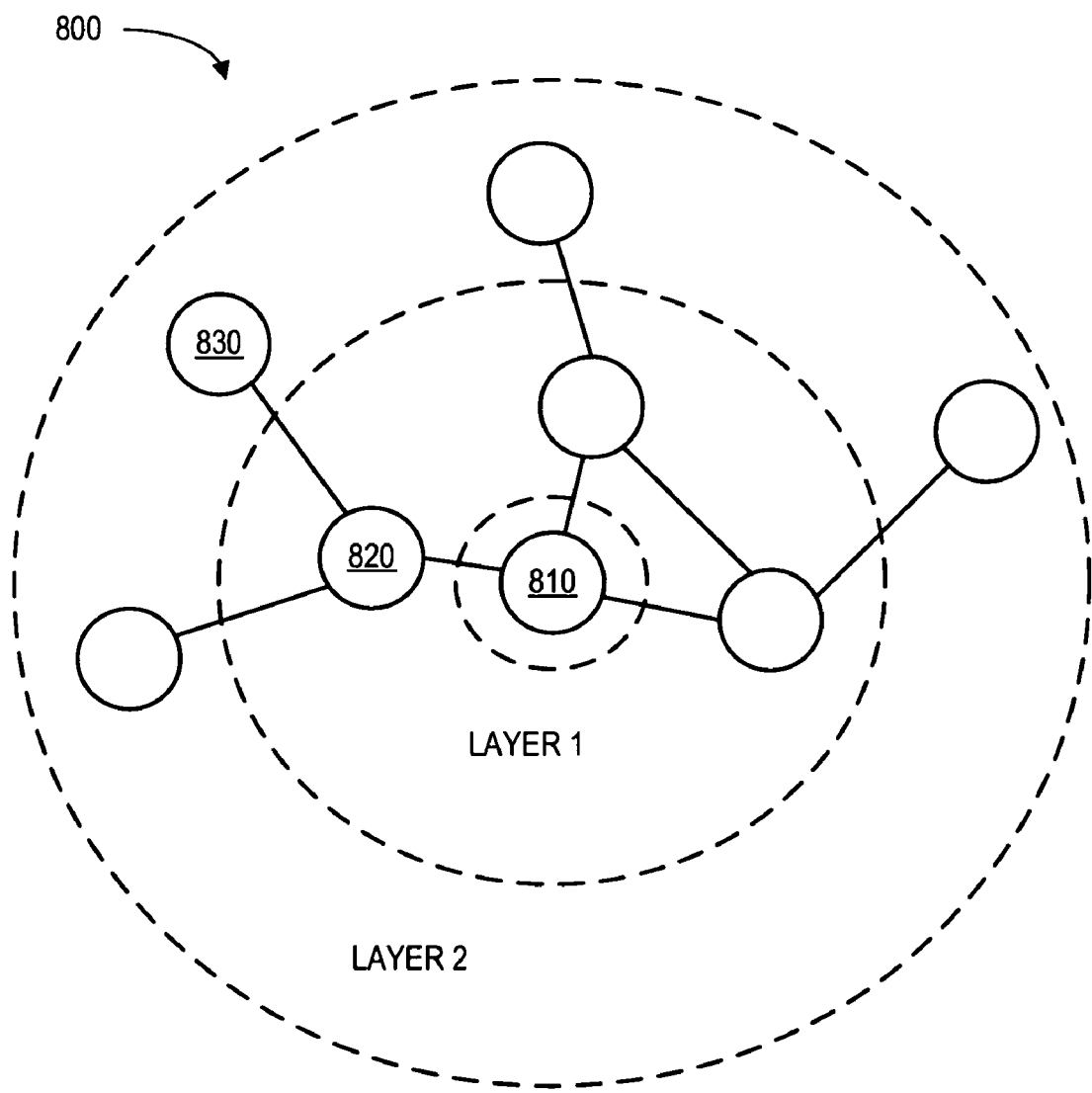
FIG. 8 is layered graph construction according to some embodiments.

FIG. 8 is layered graph construction 800 according to some embodiments. Note that other implementation techniques could be used, such as by using a matrix instead of a graph. Graph construction may proceed in layers, with the graph initially consisting of a single node, the target data object. For each layer, evidence may be found in the database that connects nodes that are already contained in the graph to nodes that are not in the graph yet. When such evidence is found, the new data object may be added to the graph, with an edge connecting the two data objects that correspond to the evidence. The process is continued for some finite number of layers.

Including more than a single layer in the graph results in finding potentially relevant data that may not be directly relevant to the target, but that may be indirectly connected. The graph 800 illustrates two layers of connectedness from a data object of interest 810. That is, data object 820 is directly linked to the data object of interest 810 (and is thus in layer 1)

while data object 830 is only linked to the data object of interest 810 through data object 820 (and is thus in layer 2).

Edges in the graph 800 may then be weighted. In one embodiment, this weight is a combination of the different evidence connecting two specific data objects, that is, the sum of the number of collected evidence of each type times its weight factor (note that although a single line is illustrated as connecting any two data objects in FIG. 8, that line might represent multiple entries in an evidence store 6). The weight factor may be the product of the evidence weight, confidence, and count associated with that evidence:

$$weight_{edge} = \sum_{e \in evidence} weight_e * confidence_e * count_e$$

Note that different graph building techniques may be used based on the type of the target data object to help the results better match what information a person may require when accessing a particular type of data object. Building the graph 800 may differ, for example, in the number of layers, type of evidence included in each layer, order in which the types of evidence are added to the graph 800, conditions for adding specific evidence, and stopping conditions.

Referring again to FIG. 7, determining the degree of relevance of each data object to the data object of interest 810 or "target" may be calculated at 704 by running an algorithm over the graph 800 that takes into account the type and amount of evidence connecting all the nodes. The algorithm may result in each node being assigned a rank, from which the data objects can be sorted at 706 and thereby ordered by degree of relevance to the target data object. Note that in some embodiments, weights can also be negative, reducing the association between documents.

According to some embodiments, evidence is bidirectional; that is, edges between nodes might initially do not point in any specific direction. The first step in ranking the nodes may be to make the graph 800 directed by forcing all edges to point towards nodes in an equal or lower layer (e.g., layer 2 nodes should point to layer 2 or layer 1 nodes). Next, each node in the graph might be scored using the following formula:

$$score_{node} = \sum_{e \in edges} weight_e$$

Figure 9:
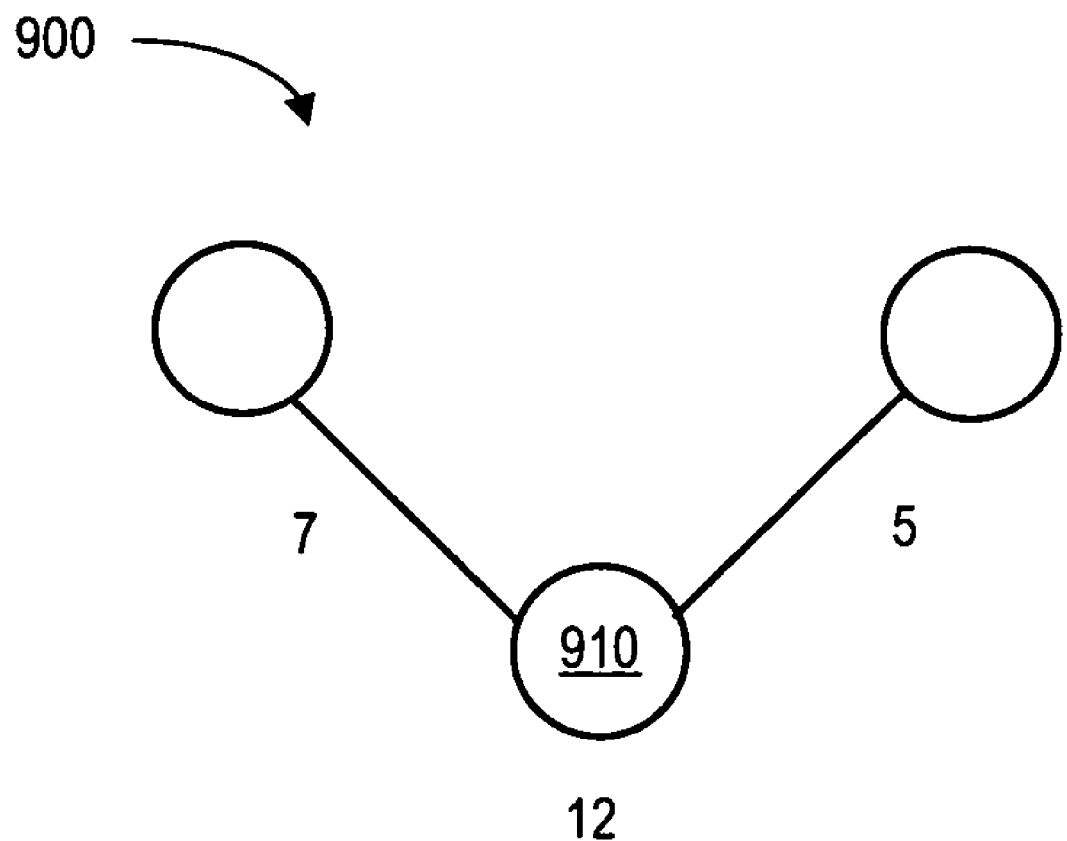
FIG. 9 illustrates relationships between data objects according to some embodiments.

FIG. 9 illustrates relationships 900 between data objects according to some embodiments. In particular, a node 910 may be scored with two connected nodes with link weights of 7 and 5, resulting in a score of 12.

Next, the rank for each entity node may be calculated:

$$rank_{node} = \sum_{e \in edges} (damping_{e.node} * rank_{e.node}) / (weight_e * score_{e.node})$$

According to some embodiments, this equation is solved by iterating until the ranks for each node do not change beyond some threshold. The damping factor may be, for example, used to weigh nodes farther away from the target data object with less value. The algorithm uses the edge weights of connected nodes to determine the rank value from which an ordering may be assigned.

According to some embodiments, a subset of data objects may be grouped together if there is a specific relationship between them. For example, if there is high confidence "file version evidence," implying that the two data objects are likely different versions of the same file, one of those data objects may be chosen to represent the group. According to some embodiments, the choice to have such objects grouped is a user-configurable setting.

This method describes a way to determine data objects relevant to a given target data object through the use of collected evidence. Referring again to FIG. 7, a further method of determining relevant data objects may be through a defined set of rules at 708. These data objects might not be included in the relevance graph and may be derived from any source. As such, they might not be ranked (and therefore may be ordered in any way) and would not affect the results of relevant data objects determined from graph construction.

Such rules may be based on the type of the target data object and could be evaluated when the target data object changes (e.g., the user changes focus). Rules may take the target data object and determine any other data objects that are related based on a defined expression, such as querying a database for specific information. For example, an incoming phone call may trigger a rule to display recent email messages from the caller.

Application of a rule might require a person to be first associated to one or more data objects. Based on the person, other relevant data objects may be determined, either in real-time or by retrieving them from a database, server, or application. Some examples of rules may be:

1. Recent email—find information about email messages that has been received from a particular person. This list might be limited by time or length.

2. Email thread—find information about email messages that are part of an email conversation with one or more people. This list might be limited by time or length.

3. Recent phone call history—find information about times of recent telephone conversations to/from a person. This list might be limited by time or length.

4. Recent instant messages—find information about recent instant message archives from a particular person. This list might be limited by time or length.

5. Recent attachments—find information about attachments that have been received from a particular person. This list might be limited by time or length.

6. Contact information—find information about a particular person, such as email address, phone number, home address, business address.

7. Appointment information—find information about appointments in the near future regarding a particular person.

If an action specifies a change of user focus, such as activating a new application window, the system may notify any registered components that a new data object has become the target and that the list of relevant data objects has been recalculated. In some embodiments, a component automatically displays the list of data objects relevant to the target data object in a GUI. The interface may include a window that resides on the side of the user's desktop computer screen. Each data object may be presented with a hyperlink that allows the object to be accessed, a display name to visually identify the object, a storage location that uniquely identifies the object, and/or a ranking value indicating its degree of relevance to the target data object. Through the graphical interface, actions might be performed on the data objects, such as opening one or more data objects, performing a search on a data object (e.g., treat it as a target data object), or removing a data object from the system databases.

In another embodiment, any registered component receives the list of relevant data objects through a programmatic interface, for example as a list of data objects containing the characteristics of the relevant objects.

According to some embodiments, when a hyperlink corresponding to a data object is selected, the default action is to instruct the system to open the data object within its native application. However, if a data object resides in a database or requires a special application to access it, selecting the hyperlink can instruct the system to communicate with a registered application to perform a custom action. This method may cover, for example, accessing email messages in a messaging application, personal contact information in an personal organizer application, appointments in a calendar application, records in a customer management application, placing phone calls, retrieving caller history records, and/or any other process that might be used to manipulate data objects. For example, if the telephone number of a person is presented as a relevant data object, selecting the number in the display may contact a Voice Over IP (VOIP) software phone running on the computer system and place a telephone call to that person's telephone number.

Figure 10:
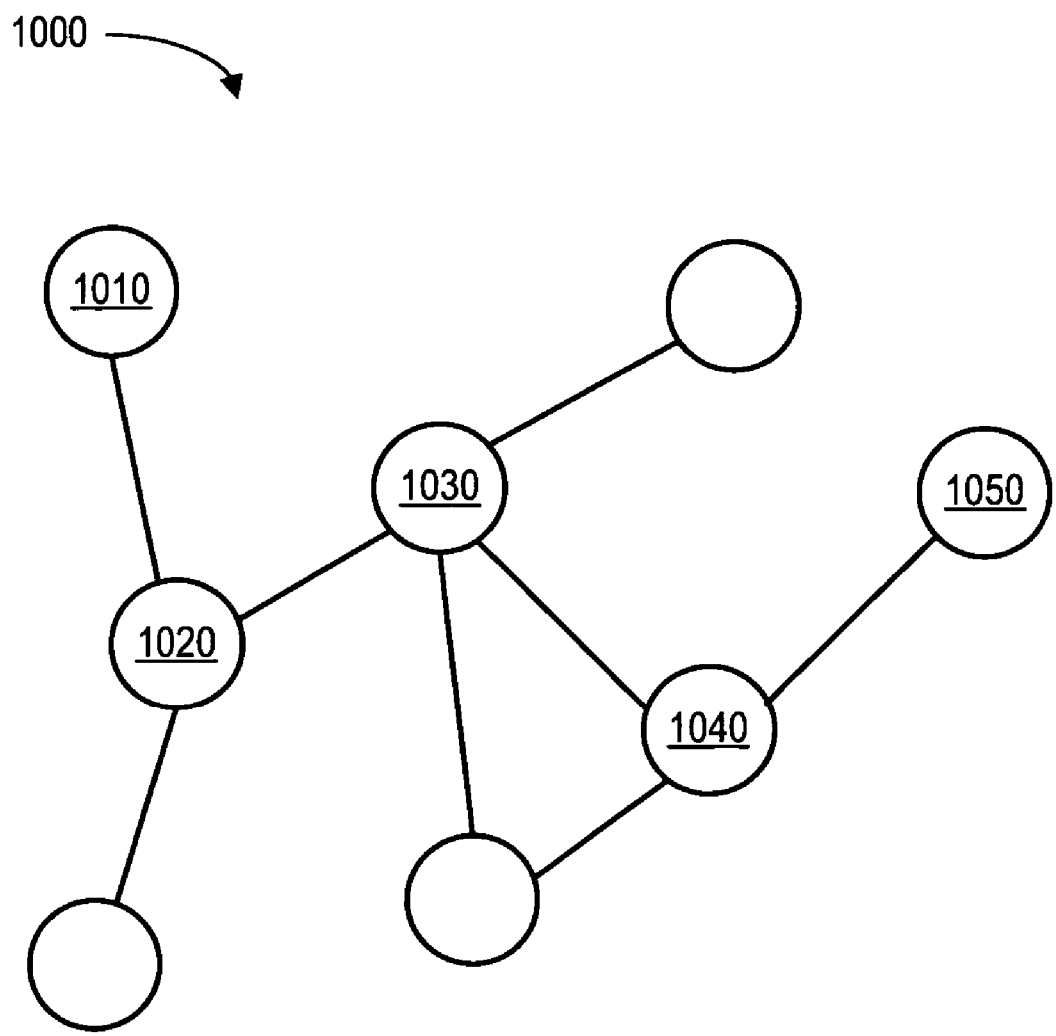
FIG. 10 illustrates indirect relationships between data objects according to some embodiments.

Relevance of information to a target data object may be determined from collected evidence. If a layered graph is used to determine relevance, data objects may be related through "indirect" connections (there need not be evidence directly connecting two data objects to signify that they are relevant to one another). For example, FIG. 10 illustrates indirect relationships between data objects according to some embodiments. In particular, data object 1010 is related to data object 1050 only through three intermediate data objects 1020, 1030, 1040.

These indirect relationships may be in contrast to other approaches that only use content to determine relevance through common terms. In such approaches, documents may be directly related via identical (or similar) words that appear in a collection of documents. However, allowing data objects to be connected through several levels of indirection might bring in information relevant to a context that an approach using only direct associations would miss.

For example, consider an email message that is received with an attachment created by the sender of the message. The attachment is saved to disk as a document, and then worked on. Some content from the Internet (e.g., an image from a Web page) is copied to the document, and the user sends the document back to the originator as a new email message attachment. If later the document creator calls and asks about the source of the excerpt, the system can determine that the Web page is relevant to the phone call, even though there is no content directly connecting the phone call and the Web page.

According to some embodiments, a data object that is displayed in the list of relevant objects may be used to initiate a further search for relevant information. This can be done to find a data object that is not yet in the list, but the user feels is relevant to one of the data objects that is in the current list.

Figure 11:
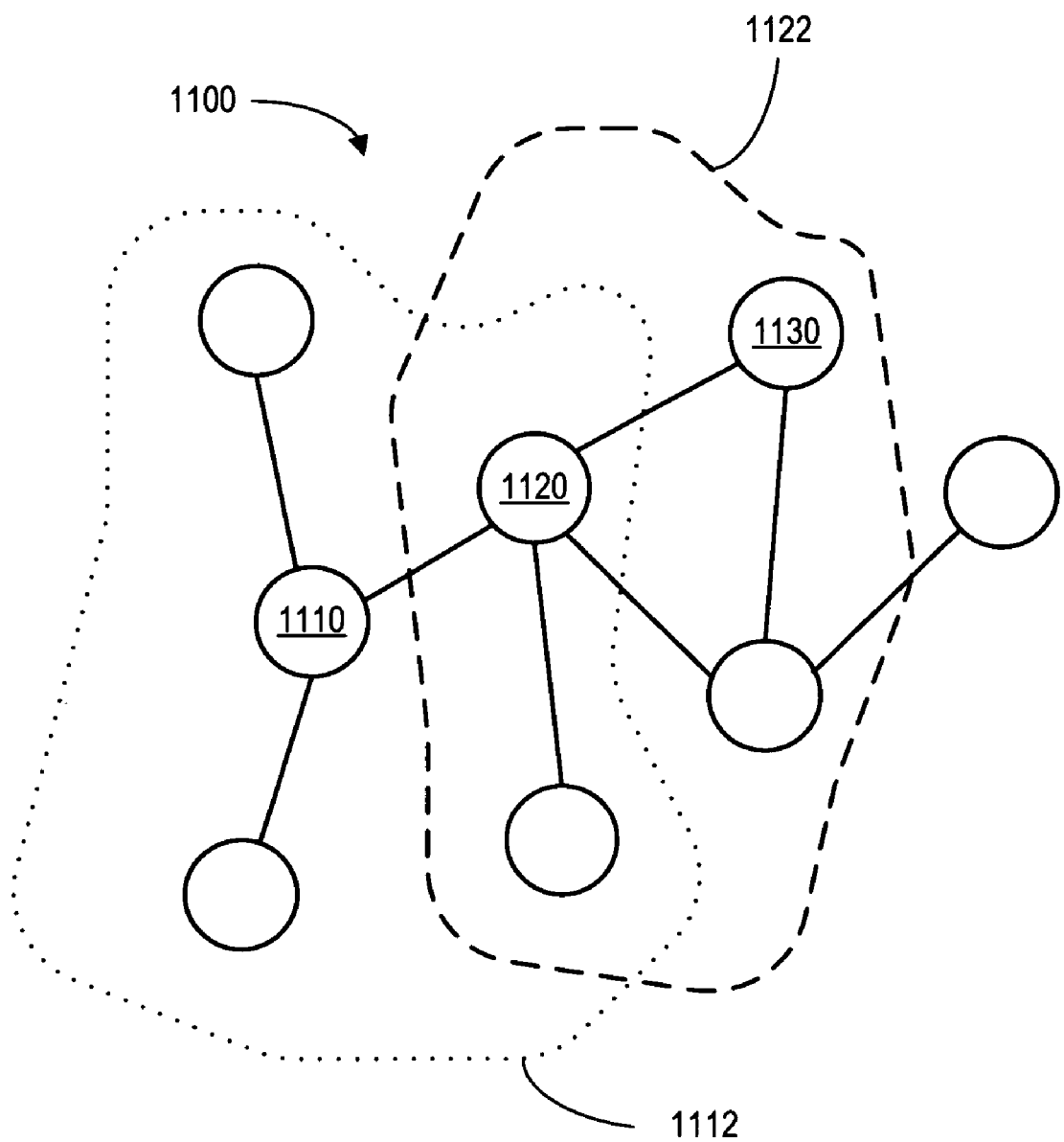
FIG. 11 illustrates an evidence-based search according to some embodiments.

FIG. 11 illustrates an evidence-based search 1100 according to such embodiments. A first data object 1110 is opened by a user, and a first set of potentially related data objects 1112 is selected by the system and displayed to the user. The user does not find the data object 1130 that he or she actually needs, but does notice a second data object 1120 that seems more related than the first data object 1110. The user can instruct the system to make that second data object 1120 the new target data object. As a result, a new set of potentially related data objects 1122 is selected by the system and displayed to the user. The user will now see the data object 1130 that is actually of interest.

For example, a user may be working on a document, for which the systems calculates other relevant documents. If the person is looking for a particular document that does not appear in the list, but feels is relevant to one of the items in the list, the user can select a special hyperlink of the item, causing it to become the target data object, resulting in a new list of relevant documents to be calculated and displayed. As a further example, suppose a user is looking for a particular email message. Perhaps a keyword search results in finding a document that was attached to the desired email. The user could then perform a search based off the located document by selecting the provided special hyperlink, causing the email to be displayed because evidence connects the email with the attachment. With this method, users may follow evidence paths to locate information based on context rather than content without entering keyword search terms.

Evidence may serve as the bases for determining data object associations. According to some embodiments, several methods are possible to generate evidence for different purposes.

For example, real-time evidence creation may be provided. In this case, processing of actions may occur as the user interacts with data objects. However, evidence might be generated as part of a background process (when the user is not actively using the system). When the system remains idle for some time, a background process may loop over available data objects and create a pseudo action encapsulating the data object, which can be processed in Phase I as if it were generated by the user accessing the data object for the first time. Similar to real-time action processing, pseudo actions may be content indexed and analyzed for evidence generation.

As another example, manual evidence creation may be provided. Typically, evidence may be generated when the system determines that there is an association between two data objects. However, there may be times when a user wishes to explicitly associate two data objects with each other (to increase the likelihood that a data object will appear in the calculated relevance list, or to increase the rank of a data object). For example, suppose a user is working on a document and wishes to associate some contact information to the document so that it is readily available the next time the document is worked on. This in effect may add a "bookmark" to the document, where the bookmark entity can be any type of data object.

According to some embodiments, a tool is provided which allows the user to create evidence by selecting the two data objects that are to be associated together. For example, the user might click an icon representing one data object and then click a different icon representing another data object. Such an action may manually create or increase an association between the two data objects. The tool might be used to manually delete associations between data objects which appear unhelpful.

According to some embodiments, the system periodically (on a synchronous or asynchronous basis) deletes evidence from the evidence store according to pre-determined and/or user-configured rules. Some examples of rules may include:

Delete evidence that was created before some time in the past.

Delete evidence when one data object is connected to too many other data objects.

Delete evidence when two data objects are determined to versions of each other.

Delete evidence when the contents of a data object has changed that would invalidate previously generated evidence.

In some cases, data objects may be stored in a database and include a storage location and unique identifier. Since data objects may be created, deleted, copied, and moved, the system might ensure that the location information of the data objects stored in the database are kept synchronized with the real locations (to maintain the integrity of the stored evidence). If the stored location and real location of a data object are not synchronized, selecting a hyperlink may result in an error because the system would not know how to find the data object and take action on it. According to some embodiments, the system keeps track of the locations of data objects as users actively create, delete, rename, copy, and/or move them. As a result, the system is able to synchronize the location information in real-time. Other embodiments can scan the existing data objects as a background process and synchronize any objects that have inconsistent location information in the database.

According to some embodiments, the process of synchronization is accomplished as follows. When a data object is processed, it may be looked up in the database using the unique identifier. If the data object is found, the location information is read from the database and compared with the real location information. If they are different, the location the location information in the database may be updated to the current real value.

The presented invention describes a method of abstractly describing user or system actions on a computer system so that different types of analysis can be performed to determine relevant associations between data objects or properties of a data object. The preferred embodiment defines a set of actions that each describes a single user interaction with a data source in an application (user generated) or a notification from a service, server, or peripheral (system generated), such as when a phone call is received or an email message is received by a mail server. These actions are generated by software components that are able to monitor changes taking place within the applications, services, servers, or peripherals. For example, an application monitor tracks how the user is interacting with a single instance of an application and determines how these interactions can be mapped into one of the defined actions. Once this mapping has been determined, an associated data object is encapsulated in the action and it is then dispatched to be processed and analyzed. Suppose a user opens a document in a word processing application; when the word processing application is first started, the monitoring component starts to keep track of the interactions with the application. Next suppose the first detected interaction is the opening of the document. The monitor therefore maps the launch of the application and the subsequent load of the document to a "document opened" action. An identifier for the document is then added to the action and dispatched for processing. If later the user activates a different application (e.g., gives it focus), the word processing application is consequently deactivated (e.g., loses focus). The monitoring component may determine that the document hosted inside the application window was deactivated and map this event to a "deactivated document" action, encapsulating the document identifier into the action and again dispatching the action.

The sequence of actions generated from the monitoring components can be saved so that patterns may be later detected in the sequence. Each action is categorized by type, e.g., a "document opened" action may be of type "Open". Providing each action with a designated type can facilitate finding certain actions and archiving different actions to simplify pattern recognition.

Figure 12:
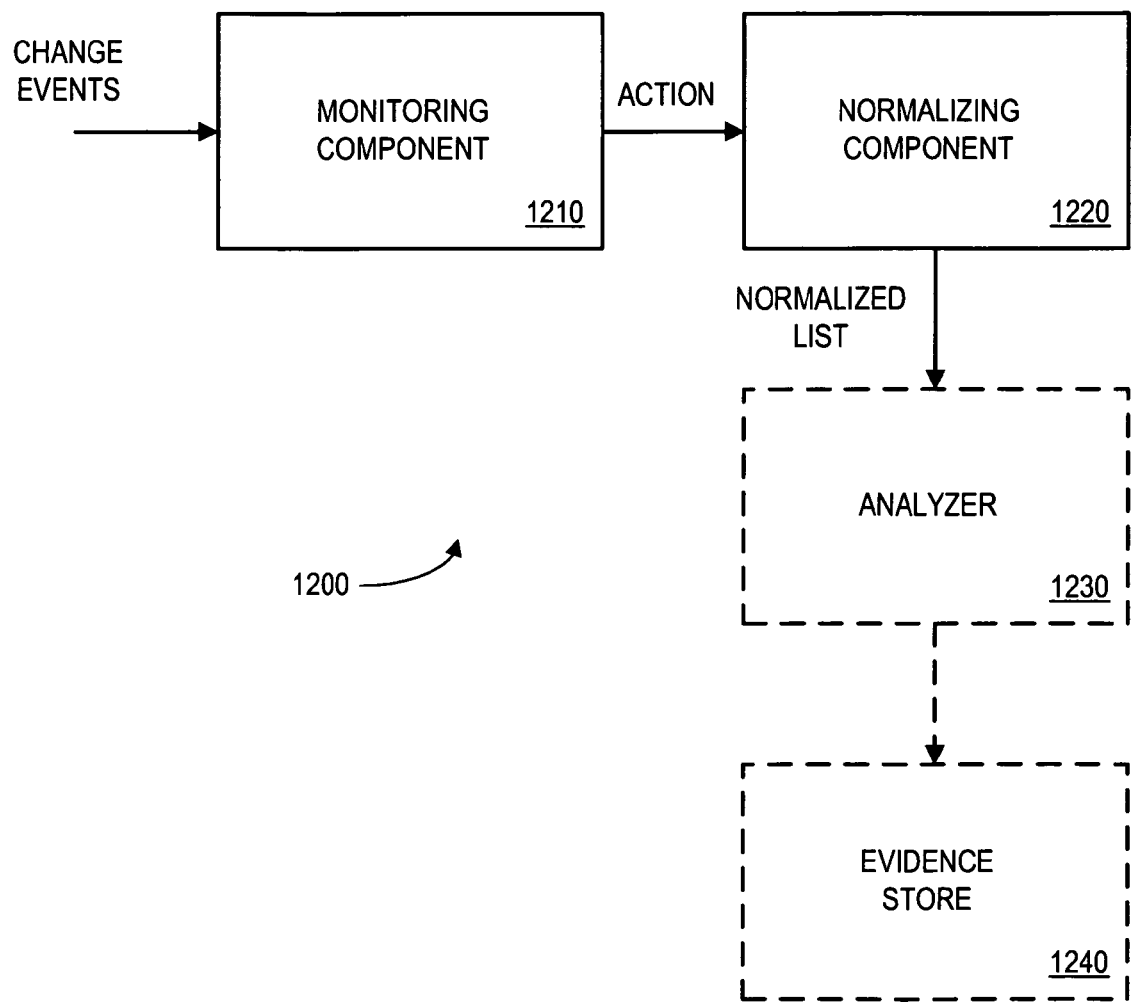
FIG. 12 illustrates a system according to some embodiments of the present invention.

One embodiment of a system 1200 to help facilitate the creation and maintenance of such a sequence of actions is provided in FIG. 12. Although some of the embodiments described with respect to FIGS. 12 through 15 are presented in connection with a context-based search engine, note that these embodiments may be associated with any other type of system or application.

The system 1200 illustrated in FIG. 12 includes a monitoring component 1210 to detect "change events" associated with a user's interaction with data objects or applications. For example, a change event might indicate that a user has opened or closed an application or document. The monitoring component interprets these events and translates them into abstract user actions, over time forming a sequence of user actions that represents how the user is interacting with a data object. Note than in some cases, the action sequence might not be formed properly. For example, one or more application monitoring components 1210 may detect incorrect change events (e.g., because of improper implementations or an incorrect event order provided by native applications being monitored).

To address such problems, each generated action associated with a change event may be provided from the monitoring component 1210 to a normalizing component 1220. The normalizing component 1220 might, for example, normalize the action sequence by either deleting actions associated with a detected change event or adding actions associated with a non-detected change event, resulting in a normalized list of actions.

The normalizing component 1220 may also output information associated with the normalized list (e.g., to another application or component). By way of example only, the normalizing component 1220 might transmit the list to an analyzer 1230 that uses the information to determine evidence of relationships between data objects. The analyzer 1230 might then store the evidence or relationships between data objects in an evidence store 1240.

Figure 13:
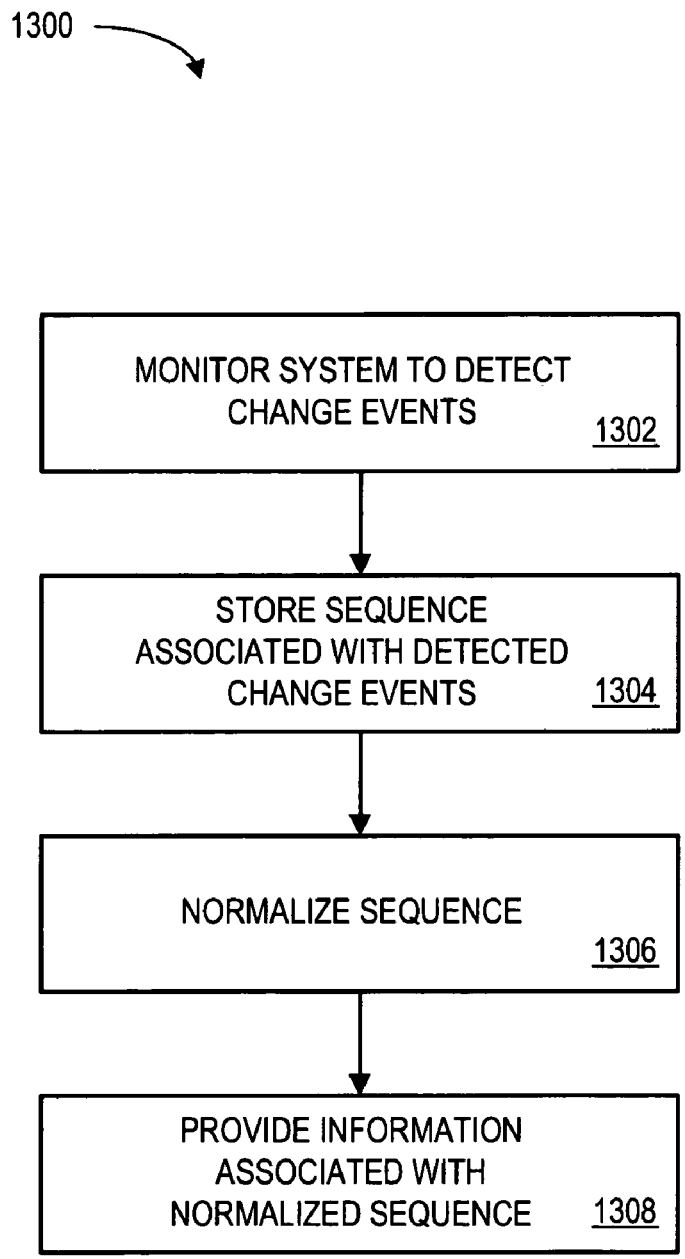
FIG. 13 is a flow chart illustrating a method according to some embodiments.
Figure 14:
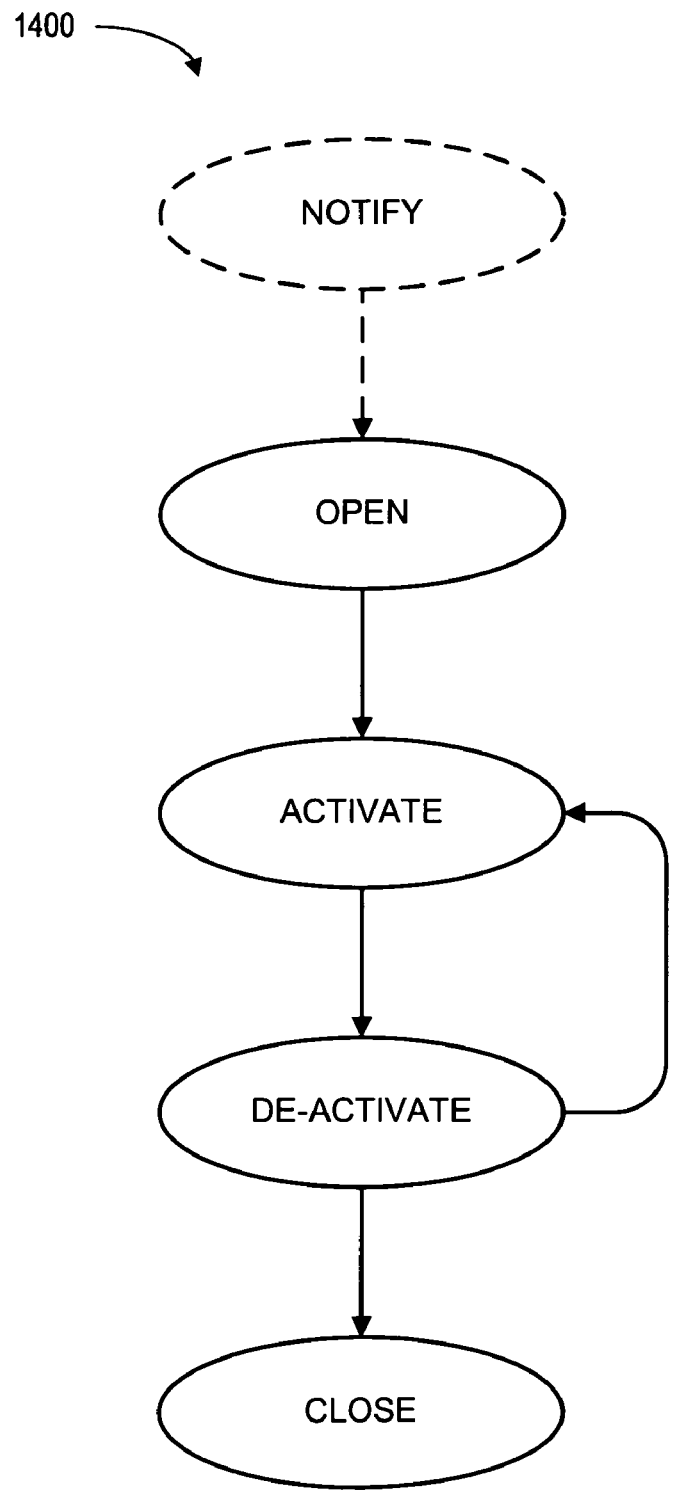
FIG. 14 is an action state diagram according to some embodiments.

FIG. 13 is a flow chart illustrating a method according to some embodiments. At 1302, a system is monitored to detect change events. For example, an application executing on a personal computer might monitor other applications executing on that computer to detect a user interaction with an application, a user interaction with a data object, an event automatically generated by an application, a service, a server, and/or a peripheral (e.g., a telephone in communication with the computer).

In some cases, a set of abstract action types may be defined, and a detected change event will be mapped into an appropriate abstract action type. As a result, the stream of actions constitutes a sequence that may be an ordered list of these abstract action types. At 1304, the sequence associated with the abstract actions is stored (e.g., on a disk drive, in memory, and/or a database). According to some embodiments, a detected change event is discarded if it is not associated with any of the defined abstract action types.

At 1306, the sequence is "normalized." For example, an action associated with a detected change event might be deleted from the sequence. Consider a change event that indicates that an object has become "active", (an activate action). A subsequent action indicating that the object has become "active" might be discarded because the object was already active. In other cases, an action associated with a non-detected change event might be added to the sequence at 1306. Information associated with the normalized sequence may then be provided at 1308 (e.g., to be analyzed by another application).

According to some embodiments, actions are generated from a software component that monitors changes in an application, service, server, or peripheral. Such a monitor might be implemented as a component that is loaded into the address space of an application (e.g., a plug-in or add-in) or as an external component that binds to an application through a well-defined interface, such as a Microsoft® Component Object Model (COM) interface, a published Application Programming Interface (API), or any other mechanism. A monitoring component could be created for each application, service, server, or peripheral instance that is supported. According to some embodiments, the monitoring components register themselves to receive notification events when significant changes occur in the monitored entity. As another approach, the components might periodically poll for changes. When a change is detected, the change may be interpreted and mapped to one of a set of defined actions. In general, an action might be any notification message that indicates a data object has been acted on in a significant way. Types of actions may include, but are not limited to, the following:

1. Open a Data Object
   a. Generated whenever a data object is opened in an application. This can be a data object that is hosted in an application window (e.g., a document opened in a word processor or a Web page loaded in a browser) or a record within an application (e.g., a selected email message in an email application).
   b. Type: Open
2. Close a Data Object
   a. Generated whenever a data object is closed (e.g., a document that was previously loaded in a word processor is subsequently closed or when a Web browser navigates to a new page and the previously page is closed).
   b. Type: Close
3. Activate a Data Object
   a. Generated whenever an application window that hosts a data object is activated.
   b. Type: Activate
4. Deactivate a Data Object
   a. Generated whenever an application window that hosts a data object is deactivated.
   b. Type: Deactivate
5. Create a Data Object
   a. Generated whenever a data object is created (e.g., a new file that is created on the system by an application or a new email message is received by a mail server).
   b. Type: Create
6. Delete a Data Object
   a. Generated whenever a data object is removed from the system or virtually removed, such as moving the item to a "recycle bin".
   b. Type: Delete
7. Copy a Data Object
   a. Generated whenever a data object is copied, such as when a user makes a new version of a file.
   b. Type: Copy
8. Replace a Data Object with another Data Object
   a. Generated whenever a data object is replaced with another data object. For example, when a user opens a word processing application with an empty document (e.g., creates a new document) and then saves the document to disk and gives the blank document a name.
   b. Type: Replace
9. Click a Hyperlink in a Data Object
   a. Generated when a hyperlink is clicked in an application, such as a Web browser. The action contains the data object that the link points to.
   b. Type: Hyperlink
10. Copy Content from a Data Object
    a. Generated when some content is copied from a data object, such as a selected portion of text from a document, and copied to a "clipboard".
    b. Type: Copy Content
11. Paste content to a data object
    a. Generated when previously copied content is pasted to a different data object, such as pasting text into a word processing document.
    b. Type: Paste Content
12. Notify that a Data Object is Ready
    a. Generated when a data object is not yet active, but the user is notified that it is available to be opened and activated. For example, if a phone call is ringing but has not been answered yet, the call data object notifies the user that the call is ready to be used.
    b. Type: Notify The sequence of actions can then be used to determine associations between data objects, such as by using any of the embodiments described with respect to FIGS. 1 through 11. For example, the identification of different patterns in user interactions while using applications can help determine how strong an association is between objects (or to a specific task). To accurately detect patterns within a sequence of actions, actions may be archived for some period of time (so that the actions can be analyzed through pattern matching and/or a set of rules). Since the proper operation of an analyzer component might depend on the action sequence being well-formed, the system may help ensure that the sequence of actions is in an appropriate proper order.

According to some embodiments, a well-formed action sequence from an application takes the form of open action, activate action, one or more deactivate/activate action pairs, deactivate action, and close action, which corresponds to the underlying data object being opened, activated/deactivated as the user gives focus to other applications, and closed, respectively. This is represented by the state diagram 1400 shown in FIG. 14. Note that according to this embodiment a notify action might precede an open action. Any of the other action types (e.g., create, delete, copy, replace, click hyperlink, copy content, paste content) may appear anywhere in the sequence since they usually occur independently of other actions. For example, a create action could simply be generated when a new data object is detected on the system. By way of example, a system might employ the following set of rules to ensure that a sequence is well-formed:

1. An activate action must follow an open action. The same data object that was opened should be immediately activated.
2. An activate action must be preceded by a deactivate action. When a data object in an application window is activated, the data object associated with the application that was previously active should be deactivated (if it exists).
3. An activate action must be ignored if the data object is active. Since the data object is already active, it does not need to the activated again until some other data object becomes activated first.
4. A deactivate action must be ignored if the data object is not active.
5. An activate action must be ignored if the data object is not open.
6. A deactivate action must be ignored if the data object is not open.

7. A close action must be ignored if the data object is not open.

If an action is received and violates one of the above rules, the system may insert or remove an action from the sequence to make sure that the integrity of the sequence is maintained.

In order for patterns to be more easily detected, some number of past actions may be archived, such as in memory or on disk. According to some embodiments, these actions may be managed in different ways to facilitate finding particular patterns. For example, all activate/deactivate actions may be stored together, or all open/close actions may be stored. These lists may be maintained and might be accessed by different components in order to analyze the historical sequence of all (or a certain category of) actions.

FIG. 15 illustrates action information in an ordered list or sequence 1500 according to some embodiments. The list 1500 includes a sequence position 1502. According to some embodiments, the list 1500 may be stored in chronological order (e.g., based on when a change event occurred).

For each entry in the list (representing an action) other parameters may be stored to describe the attributes of the action. For example, a data object identifier 1504 might define the data object source on which the action was performed (e.g., a spreadsheet from which information was copied to or from). As another example, a time stamp 1506 may define the time that the action was generated. Moreover, an action type 1508 may define the category of the action (e.g., open or activate) and/or provide a user-friendly name for the action.

Thus, embodiments described herein may provide efficient and useful ways of monitoring usage of software applications and/or services. Moreover, some embodiments may provide efficient and useful ways to facilitate a user's access to data objects.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some embodiments have been described herein with respect to a single data object being a target or focus from which a list of potentially relevant data objects may be generated, according to other embodiments more than one focus data object may be permitted (any file that is currently "open" may be considered a focus data object). In this case, separate lists of potentially relevant data objects could be generated and displayed. As another approach, the two lists could be blended according to an algorithm and then displayed to the user.

Moreover, although some embodiments have been described herein with respect to a personal computer, note that other device may practice any of the disclosed embodiments. Examples of such other devices include handheld devices, game devices, and media devices (e.g., set-top boxes).

Although some of the embodiments described with respect to FIGS. 12 through 15 are presented in connection with a context-based search engine, note that these embodiments may be associated with any other type of system. For example, the embodiments might be used to support an automated back-up application. In this case, the application might use a sequenced list to determine which data objects are related to which other data objects. These relationships may then determine when, and how, different types of information are copied to back-up storage devices. As another example, a system could learn to anticipate user actions. For example, if a user always executes an image processing application immediately after he or she executes a word processing application, the system might automatically execute the image processing application when the word processing application is executed.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method, comprising:
monitoring a system to detect change events, each change event indicating an interaction between a user and data objects within an application;
defining a set of abstract action types, wherein each abstract action type is associated with a type of interaction between a user and an application;
mapping a detected change event into an appropriate abstract action type;
associating a plurality of actions with each detected change event;
storing an ordered sequence of the actions associated with the detected change events, wherein the sequence comprises an ordered sequence of interactions between the user and the application associated with the system;
normalizing the sequence, wherein normalizing comprises:
determining if a first action of the sequence is identical to a second action of the sequence;
deleting the first action from the sequence if the first action is identical to a second action;
providing information associated with the normalized sequence to an analyzer wherein the provided information is analyzed to determine one or more pieces of relevance evidence describing a relationship between data objects;
determining the one or more pieces of relevance evidence between data objects based on the normalized sequence, wherein determining the one or more pieces of relevance evidence comprises:
retrieving the stored sequence of actions from a data store;
determining one or more pieces of relevance evidence by identifying patterns associated with the interaction between the user and the application based on the retrieved actions;
assigning a rank to each piece of relevance evidence; and
sorting the one or more pieces of relevance evidence based on the assigned rank,
wherein each piece of relevance evidence comprises (i) a type to identify each piece of relevance evidence, (ii) a weight to identify an importance of each piece of relevance evidence, and (iii) a confidence to identify a reliability of each piece of relevance evidence;
determining a first data object of interest;
based on the relevance evidence, selecting a second data object associated with the first data object; and
presenting to the user a list of related data objects, including the second data object.

2. The method of claim 1, wherein a change event is associated with at least one of: (i) a user interaction with an application, (ii) a user interaction with a data object, (iii) an action automatically generated by an application, (iv) a service, (v) a server, or (vi) a peripheral.

3. The method of claim 1, wherein a detected change event is discarded if it is not associated with an abstract action type.

4. The method of claim 1, wherein the set of abstract action types includes at least one of: (i) open data object; (ii) close data object; (iii) activate data object; (iv) deactivate data object; (v) create data object; (vi) delete data object; (vii) copy data object; (viii) replace data object; (ix) active hyperlink in data object; (x) copy content from data object; (xi) paste content within data object; and (xii) notification that data object is ready.

5. The method of claim 1, wherein said normalizing includes:
ensuring that an open data object action is followed by an activate data object action of the same data object.

6. The method of claim 1, wherein said normalizing includes:
ensuring that an activate data object action is preceded by a deactivate data object action of a previously active data object.

7. The method of claim 1, wherein said normalizing includes at least one of:
(i) ensuring that a deactivate data object action is ignored if the data object is not active, (ii) ensuring that an activate data object action is ignored if the data object is not open, (iii) ensuring that a deactivate data object action is ignored if the data object is not open, and (iv) ensuring that a close data object action is ignored if the data object is not open.

8. The method of claim 1, further comprising:
archiving the sequence in an order based on at least one relevant parameter.

9. The method of claim 8, wherein the relevant parameter is associated with a chronological order in which the change events occurred.

10. The method of claim 1, wherein the sequence includes at least one of: (i) an action type, (ii) a data source, (iii) a time stamp, or (iv) an action name.

11. The method of claim 1, wherein the first data object is of interest to the user.

12. A computer memory storing instructions adapted to be executed by a processor to perform a method, said method comprising:
monitoring a system to detect change events, each change event indicating an interaction between a user and data objects within an application;
defining a set of abstract action types, wherein each abstract action type is associated with a type of interaction between a user and an application;
mapping a detected change event into an appropriate abstract action type;
associating a plurality of actions with each detected change event;
storing an ordered sequence of the actions associated with the detected change events, wherein the sequence comprises an ordered sequence of interactions between the user and the application associated with the system;
normalizing the sequence, wherein normalizing comprises:
determining if a first action of the sequence is identical to a second action of the sequence;
deleting the first action from the sequence if the first action is identical to a second action;
providing information associated with the normalized sequence to an analyzer wherein the provided information is analyzed to determine one or more pieces of relevance evidence describing a relationship between data objects;
determining the one or more pieces of relevance evidence between data objects based on the normalized sequence, wherein determining the one or more pieces of relevance evidence comprises:
retrieving the stored sequence of actions from a data store;
determining one or more pieces of relevance evidence by identifying patterns associated with the interaction between the user and the application based on the retrieved actions;
assigning a rank to each piece of relevance evidence; and
sorting the one or more pieces of relevance evidence based on the assigned rank,
wherein each piece of relevance evidence comprises (i) a type to identify each piece of relevance evidence, (ii) a weight to identify an importance of each piece of relevance evidence, and (iii) a confidence to identify a reliability of each piece of relevance evidence;
determining a first data object of interest;
based on the relevance evidence, selecting a second data object associated with the first data object; and
presenting to the user a list of related data objects, including the second data object.

13. The medium of claim 12, a change event is associated with at least one of: (i) a user interaction with an application, (ii) an action automatically generated by an application, or (iii) a service.

14. An apparatus, comprising:
a monitoring component to detect change events in a system, each change event indicating an interaction between a user and data objects within an application, to define a set of abstract action types, wherein each abstract action type is associated with a type of interaction between a user and an application, to mare a detected change event into an appropriate abstract action type, to associate a plurality of actions with each detected change event, and to store a sequence of the actions associated with the detected change events, wherein the sequence comprises a sequence of interactions between the user and the application associated with the system; and
a normalizing component to normalize the sequence associated with detected change events, wherein normalizing comprises:
determining if a first action of the sequence is identical to a second action of the sequence;
deleting the first action from the sequence if the first action is identical to a second action;
wherein the normalizing component is further to provide information associated with the normalized sequence to an analyzer, wherein the provided information is analyzed to determine relevance evidence between data objects, and based on the relevance evidence a first data object of interest is to be determined and a second data object associated with the first data object is to be selected, wherein a list of related data objects, including the second data object is to be presented to the user, wherein relevance evidence is to be determined between data objects based on the normalized sequence,
wherein determining the relevance evidence comprises:
retrieving the stored sequence of actions from a data store;

determining one or more pieces of relevance evidence by identifying patterns associated with the interaction between the user and the application based on the retrieved actions;

assigning a rank to each piece of relevance evidence; and sorting the one or more pieces of relevance evidence based on the assigned rank, wherein each piece of relevance evidence comprises (i) a type to identify each piece of relevance evidence, (ii) a weight to identify an importance of each piece of relevance evidence, and (iii) a confidence to identify a reliability of each piece of relevance evidence.

15. The apparatus of claim 14, further including:

an evidence store to store the evidence or relationships between data objects, wherein the analyzer is to receive from the normalizing component information associated with the normalized sequence and is to determine evidence of relationships between data objects.

* * * * *